Nov. 10, 1953  W. L. LYON  2,658,521
PRESSURE RESPONSIVE CUTOFF VALVE
Filed Dec. 29, 1951  2 Sheets-Sheet 1

Inventor
William L. Lyon
By Beale and Jones
Attorneys

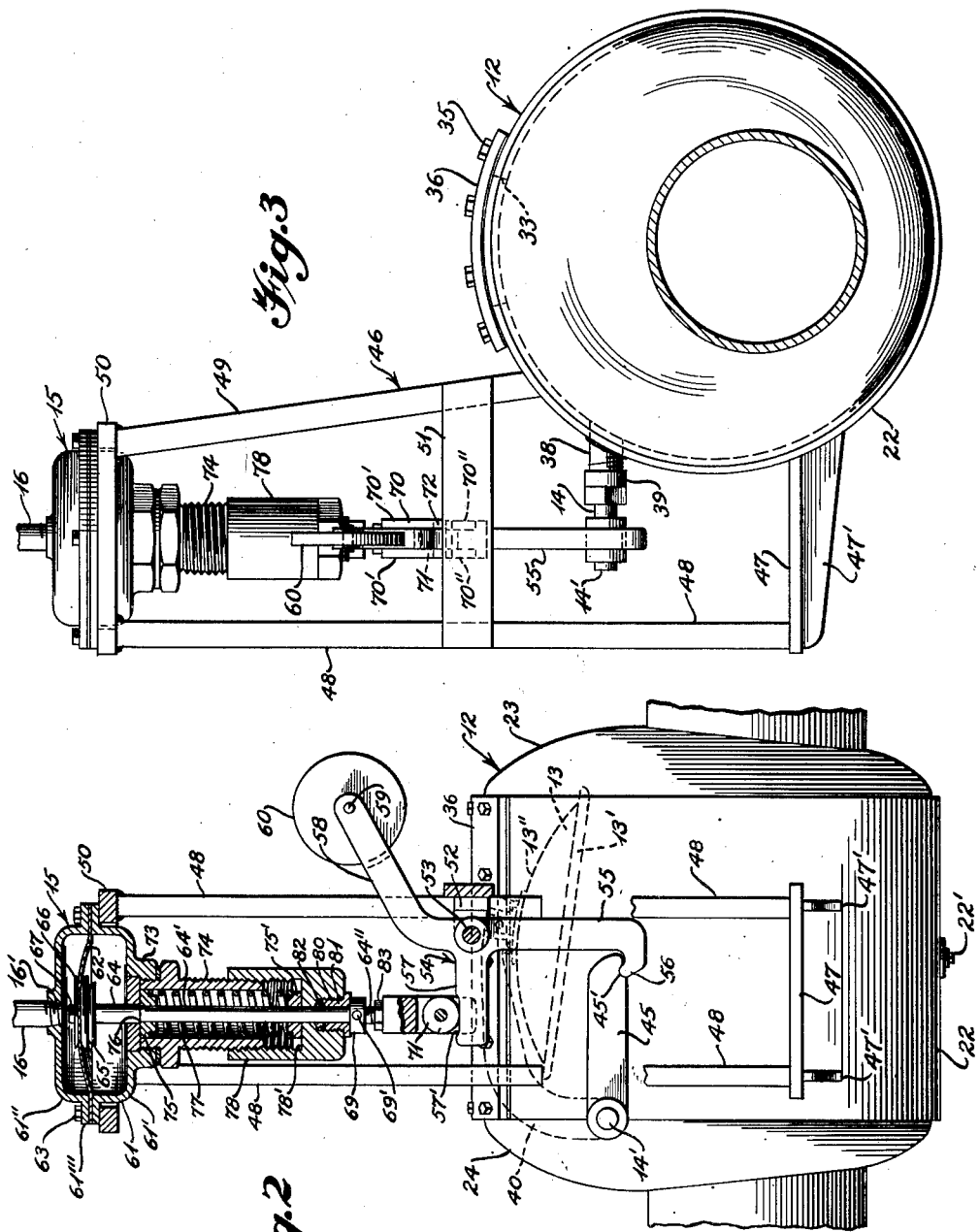

Patented Nov. 10, 1953

2,658,521

UNITED STATES PATENT OFFICE 2,658,521

PRESSURE RESPONSIVE CUTOFF VALVE

William L. Lyon, South Norwalk, Conn.

Application December 29, 1951, Serial No. 264,211

2 Claims. (Cl. 137—461)

This invention relates to improvements in a pressure responsive cut off valve for a conduit conducting fluid.

In the operation of pipe lines conducting high pressure natural gas it becomes necessary to provide a safety cut off valve in the line which is actuatable to cut off the flow therethrough when a pressure regulator fails in the line and excess pressures are built up through such failure. It is highly desirable that the cut off valve be positive in operation in order that the flow in the pipe line may be interrupted to prevent a condition of excessive high pressure in the downstream line beyond the regulator valve.

It is an object of my invention to provide a gravity actuated cut off valve for interrupting the fluid flow in a conduit when an excessive pressure actuates a pressure responsive device to trip a gravity actuated cut off valve.

A further object of the invention is to provide a cut off valve which may be easily inserted in a conduit for conducting fluid wherein the valve will swing to closed position under the influence of gravity to interrupt the flow and will so remain until manually reset to an open position.

A still further object of the invention is to provide a pressure responsive trip device for a gravity actuated cut off in which the pressure responsive trip device may be adjustably biased to counteract a certain pressure above which pressure condition the trip is actuated permitting the cut off valve to pivot downwardly to closed position.

Another object of my invention is to provide a cut off valve of the disc type which is pivotally mounted within a valve housing having an axially positioned inlet and outlet in the valve body and wherein the disc closure may be pivoted within the housing of the valve so as to permit the free flow of fluid through the valve when the disc closure is in open position.

Still further objects and the entire scope of applicability of the present invention will become apparent from the detailed description given hereinafter; it should be understood, however, that the detailed description and specific example is given by way of illustration only and, while indicating preferred embodiments of the invention, is not given by way of limitation, since various changes and modifications within the spirit and scope of the invention will become apparent to those skilled in the art from this detailed description.

For a more complete understanding of the nature and scope of my invention reference can be had to the following detailed description taken in connection with the accompanying drawings in which;

Figure 2 is a vertical partial cross sectional view of the cut off valve showing the pressure responsive trip mechanism in cross section; and Figure 3 is a vertical elevation as viewed at the left of Figure 2 of the cut off valve.

Throughout the specification and drawings like reference numerals refer to similar parts.

Figure 1:
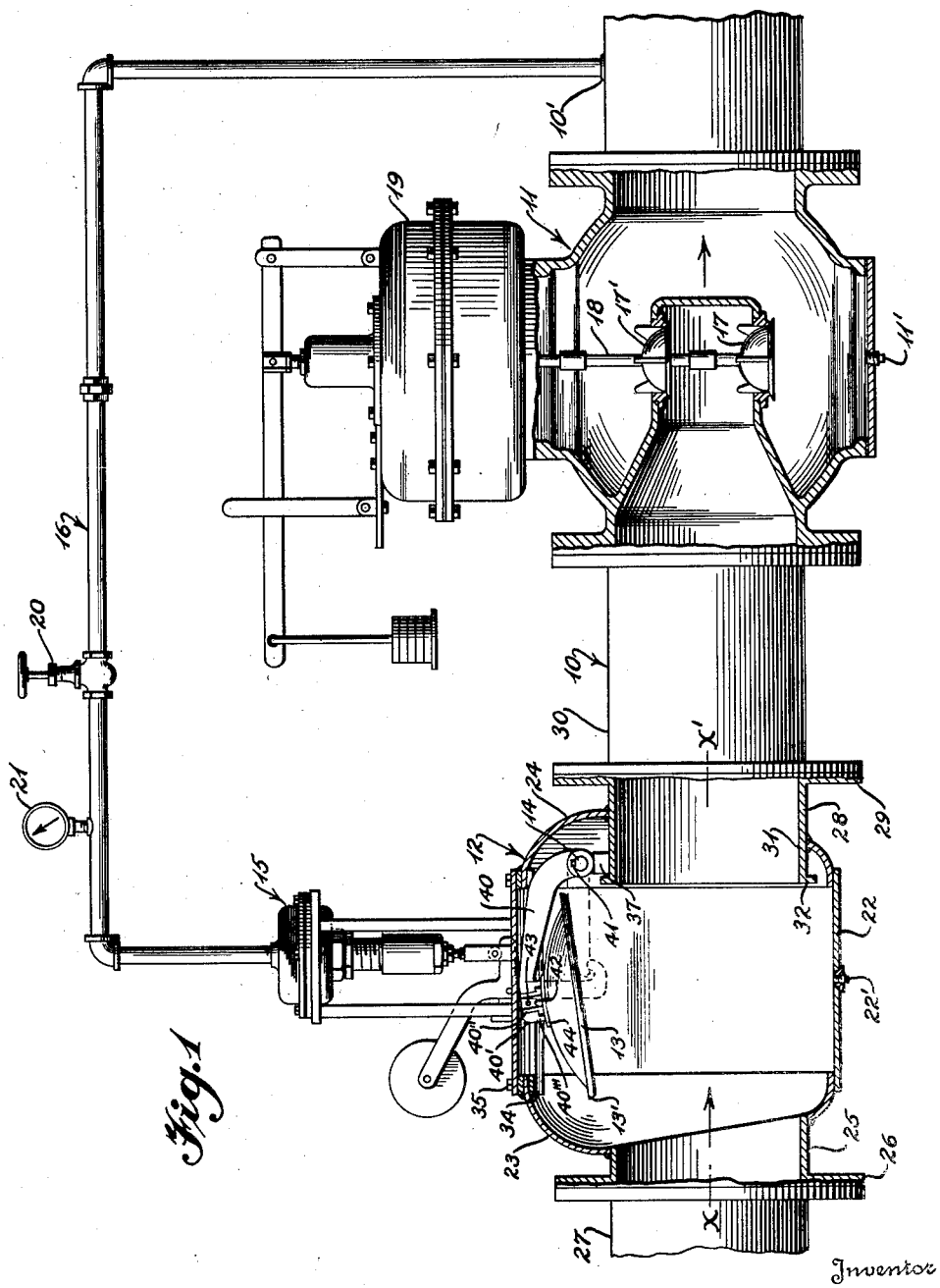
Figure 1 is a side elevation partly in section showing a conduit conducting fluid having a pressure regulator therein and a pressure responsive cut off valve having a pressure control trip connected to the downstream side of the conduit conducting fluid.

Referring to Figure 1, there is depicted, by way of illustration, a section of a fluid conducting conduit 10 having connected therein a typical pressure regulator generally indicated at 11 and a cut off valve 12 upstream from the regulator valve 11.

Cut off valve 12 is provided with a dish-like closure 13 pivotally mounted on the cross shaft 14 which is interconnected to a pressure responsive trip generally indicated at 15 that is in turn connected through a pressure control line 16 to the downstream side of the pressure regulator 11 in the fluid conducting conduit 10 as to 10'. Thus, if excess pressures are built up on a downstream side of the pressure regulator 11 due to failure thereof, control line 16 applies the same pressure to the pressure responsive trip mechanism 15 to trip the closure 13 so that it will pivot downwardly to cut off the flow through valve 12 and thus the fluid flow through conduit 10.

The pressure regulator 11 may be of any type and by way of illustration there is shown a regulator valve having a valve section as indicated at 17 and 17' mounted on a valve stem 18 which is connected through the regulator head generally indicated at 19. The pressure control line 16 is provided with a cut off valve 20 and a pressure gage 21.

The cut off valve 12 will now be described with reference to Figures 1, 2, and 3 of the drawing. The housing for the valve closure 13 consists of an elongated cylindrical housing 22 having inwardly extending bell-shaped ends 23 and 24 which have aligned apertures lying on a common axis. The lowest portion of housing 22 is provided with a removable drain plug 22'. Attached to the apertured end of the housing at 23 is a cylindrical sleeve 25 having a vertically extending flange on the outer end thereof at 26 that is connected into section 27 in the pipe line or conduit 10. The other end 24 of the housing has mounted therein a sleeve 28 with a flanged outer end 29 for like coupling into a section 30 of the conduit or pipe line 10 and is provided with an inwardly extending portion 31 which extends within the valve housing so that the sleeves 25 and 28 are in axial alignment and have a common horizontal axis X—X' therethrough. On the inner peripheral end of sleeve 28 there is formed or attached a valve seat 32 which lies in an approximately vertical plane which is perpendicular to the common axis X—X' through the valve housing. An access aperture for the elongated housing 22 is provided in the upper portion thereof as indicated at 33 in Figure 3 and a suitable backing strip 34 is mounted within the housing 22 around the periphery of the aperture 33 and serves to receive hold down bolts 35 which secure the access plate 36.

The pivotal mounting means for the dish-like closure 13 will now be described. Shaft 14 which extends transversely to the axis X—X' is mounted in a bearing 37 attached to the upper portion of sleeve 28 adjacent the valve seat 32 and extends out through the housing portions 22 and 24 through a boss-like bearing 38 as shown in Figure 3. The outer end of shaft 14 as at 14' extends outboard of the valve housing. A stuffing box generally indicated at 39 is secured about the shaft 14 and over the end of the boss-like bearing 38. A pivot arm 40 for mounting the disc closure 13 is secured to the inner end of shaft 14 by the key 41. The outer end 40' of arm 40 has a transverse aperture 40'' therein which receives a boss 42 fixed to the back face of the closure 13 at the center thereof. Boss 42 is connected to the arm portion 40' by means of a pivot pin 43. The outer end of 40' of arm 40 is provided transversely extending elements 40''' which press against a reinforcing plate 44 secured to the rear of closure 13. This pivotal connection of the closure 13 on the end of arm 40 permits its turned up peripheral rim 13' to align itself with the valve seat 32 when the valve closure 13 is allowed to pivot to closed position and thereby makes a tight seal to prevent pressure from the upstream end of line 10 passing on through the cut off valve 12.

Referring to Figure 2 the outer end of shaft 14' has rigidly mounted thereon a trip arm 45 having a dwell portion 45' on the bottom face thereof and towards its outer end for engagement with a bell-crank 54 to be described.

A support frame structure generally indicated at 46 is attached to the outside of valve housing 22 and consists of a horizontally extending platform which is supported on struts 47—47' attached to and extending out from the housing 22 toward its bottom. A pair of vertical strut members 48—48 are supported by platform 47 while an upwardly extending strut member 49 is attached to the housing 22 towards its upper portion so as to be in spaced relation to the upwardly extending strut members 48—48. The upper ends of the strut members 48 and 49 support an annular mounting plate 50 which is disposed in a horizontal plane. Intermediate the ends of the strut member 48 and 49 and connected thereto is a cross mounting bar 51. A pillow block 52 on cross bar 51 serves to mount a horizontally extending shaft 53 on which in turn is pivotally mounted a bell-crank generally indicated at 54. Bell-crank 54 is thus rotatable in a vertical plane and consists of a depending trip arm 55 having a transversely and upwardly extending lug 56 on the outer end thereof for engagement with the dwell 45' on the outer underneath side of trip arm 45 rigidily attached to shaft 14. The second arm 57 of the bell-crank 54 extends at right angles to the arm 55 and in a direction on the same side thereof as the projecting lug 56 on the trip arm 55 and is provided on its upper outer face with a recessed portion or dwell portion 57'. The bell-crank 54 is further provided with an upwardly and outwardly extending arm 58 which extends outwardly as respects the second arm 57 and has mounted on the outer end thereof as by means of pin 59 a weight member 60. This bell-crank 54 and its trip engaging arm 55 with its lug 56 is held under the trip arm 45 at the dwell portion 45' by the weight of the bell crank 54 and particularly the weight portion 60 on the outer end of arm 58 thereof.

In order to unlatch the trip arm 45 the bell-crank 54 must be pivoted in the counterclockwise direction as viewed in Figure 2 or a clockwise direction as viewed in Figure 1. When the trip arm 55 rotates counterclockwise as viewed in Figure 2, the lug portion 56 comes out of engagement with the dwell portion 45' in the end of trip arm 45 and allows the pivotal mounting arms and shaft mounting pivot arm 40 and closure 13 to pivot downward under the influence of gravity and thereby cut off the valve.

The fluid pressure responsive operator 15 mounted on the struts 48 and 49 extending from the housing 22 will now be described. A fluid pressure housing 61 comprises two cups 61' and 61'' having a peripheral flange 61''' thereon which houses the diaphragm 62 that is held tightly between the flange portions 61''' by means of cap screws 63. Upper cup 61'' is apertured at 16' for receiving the end of the pressure control line 16. Attached to diaphragm 62 is a depending control rod 64 as by means of a suitable head portion 65, washers and a cap screw 67 extending through the center of the diaphragm into the end of rod 64. Control rod 64 has a reduced portion 64' and the lower end is threaded at 64'' to receive a locking collar 69 which is secured thereto by means of a pin 69'. The lower threaded end 64'' of the control rod 64 also receives a U-shaped bracket 70 as best shown in Figure 3 which has mounted between its bifurcated legs 70'—70' and spaced from the ends thereof a roller 71 by means of the pivot pin 72. This roller as shown in Figure 2 engages in a dwell portion 57' in the upper surface of the bell-crank arm 57 while the depending end portions of the U-shaped bracket as indicated at 70''—70'' extend down over the sides of the arm 57 for guide purpose.

The lower cup 61' of the pressure housing has an internally threaded depending sleeve 73 which receives an externally threaded elongated sleeve 74 extending in spaced relation about the control rod 64 for a portion thereof. Mounted over the upper end of the reduced portion 64' on control rod 64 is a washer 75 which rides against the outwardly extending shoulder 76 on the upper portion of control rod 64. This washer 75 serves to receive thereagainst the upper end of a compression spring 77 mounted within the elongated sleeve 74 and extends out through the bottom end thereof against a similar washer 75' slid over the end of control rod 64. An end cap 78 that is internally threaded is received over the lower end of the threaded sleeve 74 and is apertured at its central end cap portion to be received over the control rod 64. The interior of the cap 78 is provided with a horizontally extending internal shoulder 78' which rides against the washer 75' engaging the lower end of spring 77. Thus when the cap 78 is threaded along the sleeve 74, pressure is applied to the biasing spring 77 which through the washer 75 at the upper end thereof engages the shoulder 76 on the upper end of control rod 64 and urges the control rod upward as well as the attached diaphragm 62 on the upper end thereof. The lower end of the screw cap 78 has a threaded recess 80 therein which extends in spaced relationship about control rod 64 passing therethrough and this recess 80 receives a stuffing screw 81 which compresses stuffing 82 about the control rod 64. A locknut 83 is threadedly received over the threaded end 64" of the control rod so as to be tightened down against the upper horizontal surface of the U-shaped bracket 70 which carries the roller 71.

Referring again to the control valve 12 there is provided a removable drain plug in the form of the screw 22' in the lower-most portion thereof. The reducing valve 11 is also provided with a similar drain plug at 11' at the lowermost portion of the housing.

The fluid pressure responsive operator 15 receives the control pressure through the control line 16 which acts on the upper surface of the diaphragm 62 that in turn moves the control rod 64 downwardly against the upper end of the compression spring 77 which has been adjusted for a certain biasing action by means of the screw cap 78. The spring 77 is set for a certain pressure and when this certain pressure is exceeded the biasing action of spring 77 is overcome and it is further compressed permitting the control rod 64 to move downward. The downward movement of the rod 64 moves roller 71 on the end thereof against the outer end of the bell-crank arm 57 at the dwell portion 57' thereof and rotates the bell-crank 54 in a counterclockwise direction as viewed in Figure 2. Upon rotating this bell-crank 54 in a counterclockwise direction, the outer end 56 of the depending arm 55 of the bell-crank is rotated out of engagement with the trip arm 45 rigidly attached to shaft 14 and this permits the shaft to rotate and the arm 40 fixed thereto carrying the closure 13 is rotated under the influence of gravity whereupon the closure 13 seats against the valve seat 32 cutting off the flow of fluid through the conduit 10.

Other uses of this cut-off valve may be made in air, gas, and liquid lines for the control of the flow therein and this example here given is by way of illustration only.

In operation after the spring 77 is set with the desired pressure by means of the screw cap 78, the closure 13 is rotated with its pivot mounting means, as by manually grasping the trip arm 45 with the hand and then setting the bell-crank 54 so that it is in engagement with the trip arm 45. The valve is now ready for use. When the pressure exceeds the set pressure in the line 16, the valve is tripped and a positive cut off takes place since the closure 13 falls under the influence of gravity to a closed position and the pressure acts against the rear face 13" to hold the valve tightly seated against the seat 32 and prevent any flow of fluid through the conduit 10.

I claim as my invention:

1. A pressure responsive cut-off valve for a conduit conducting fluid comprising, in combination, a horizontally extending valve housing having a central cylindrical portion, inwardly extending bell-like ends on the housing having aligned apertures therein, one of said ends having a flanged sleeve connected thereto adapted to be connected into the conduit, the other of said ends having a flanged sleeve for connecting into the conduit line and having its sleeve extending into the central cylindrical portion, said sleeves being aligned and having a common horizontal axis, and a valve seat disposed in an approximate vertical plane on the periphery of the inner end of said inwardly extending sleeve; a pivotally mounted closure plate for cooperation with the valve seat end of the inwardly extending sleeve within said valve housing; pivotal mounting means for said closure plate attached to the inwardly extending sleeve within said valve housing permitting the plate to swing upwardly allowing clear passage of fluid through said valve housing and its aligned sleeves and to swing downwardly to rest against said valve seat to cut off passage of fluid through said valve; said pivotal mounting means comprising a shaft rotatably mounted in said valve housing above said inwardly extending sleeve and adjacent said valve seat end thereof and lying in a plane extending parallel to the plane of said valve seat and projecting at one end outside of the valve housing, and an arm fixed to said shaft and attached to said closure plate for rotating same to open and closed position when said shaft is rotated; a trip arm fixed to the outer end of said shaft; a bell-crank pivotally mounted on said valve housing having one of its arms provided with catch means for detachably engaging said trip arm to hold said closure in open position, a second arm, and weight means to rotate said bell-crank in one direction to engage said trip arm; and a fluid pressure responsive operator mounted on said valve housing for cooperation with said bell-crank to rotate it to release said trip arm permitting said closure plate to rotate under the influence of gravity to closed position, comprising a fluid control pressure housing adapted to be connected to a fluid pressure source, a diaphragm mounted in said housing and movable in response to pressure applied to said pressure housing, an operating rod connected at one end to said diaphragm and movable therewith and having its other end engageable with said second arm of the bell-crank, a sleeve attached at one end to said pressure housing and extending in spaced relation about said operating rod and threaded on the outside thereof, spring means in said sleeve disposed about said operating rod and connected at one end to said rod, an interiorly threaded closure cap apertured at its end permitting said rod to extend therethrough and threadedly received on the threaded exterior of said sleeve to compress said spring in said housing and against its connection with said rod, whereby said spring connected to said rod may be compressed to counteract a certain pressure acting on said diaphragm in said pressure housing, said spring being compressed and said rod moved when said certain pressure acting on the diaphragm is exceeded whereupon said rod engaging said bell-crank pivots the bell-crank allowing said closure and closure pivotal mounting means to pivot downward under the influence of gravity to cut off fluid passage through said valve.

2. A pressure responsive cut-off valve for a conduit conducting fluid comprising an elongated valve housing open at each end adapted to be connected in the conduit and having a valve seat lying in an approximately vertical plane and on one of said open ends, a disc-like closure within said valve housing for seating against said valve seat to close off said opening at the valve seat end of the housing, means mounting said disc-like closure in said valve housing for upward pivotal movement to open position to permit fluid passage through said valve housing and to a pivotal downward closed position against said valve seat to cut off fluid passage through said housing, said disc-like closure and its pivotal mounting means being gravity actuated to downward closed position, an arm extending outside of said valve housing and fixed to said pivotal mounting means for the closure and pivotal therewith, trip means on said housing operably engaging said arm outside of said valve housing for holding said closure in upwardly pivoted open position, a fluid pressure responsive operator associated with said trip means for moving said trip means out of engagement with said arm in response to an excess pressure, said trip means on said housing comprising a bell-crank pivotally mounted on said housing and having one arm provided with means for engaging said arm fixed to said pivotal mounting means for said closure and the other arm engageable by said fluid pressure responsive operator whereby movement of said fluid pressure operator in response to excess pressure pivots said bell-crank so that the arm engaging means thereon moves out of engagement with said arm fixed to said pivotal mounting means for the closure whereupon said closure and its mounting means pivots downward under the influence of gravity so that the closure rests on said seat to cut off fluid passage through said valve, said fluid pressure responsive operator comprising a fluid control pressure housing adapted to be connected to a fluid pressure source, a diaphragm mounted in said housing and movable in response to pressure applied to said pressure housing, an operating rod connected at one end to said diaphragm and movable therewith and having its other end engageable with said bell-crank, a sleeve attached at one end to said pressure housing and extending in spaced relation about said operating rod, spring means in said sleeve disposed about said operating rod and connected at one end to said rod, a closure for the other end of said sleeve apertured to permit passage of said rod therethrough and engageable with the other end of said spring to compress said spring in said housing and against its connection with said rod, said closure being adjustably mounted on said sleeve whereby said spring connected to said rod may be compressed to counteract a certain pressure acting on said diaphragm in said pressure housing, said spring being compressed and said rod moved when said certain pressure acting on the diaphragm is exceeded whereupon said rod engaging said bell-crank pivots the bell-crank allowing said closure and closure pivotal mounting means to pivot downward under the influence of gravity to cut off fluid passage through said valve.

WILLIAM L. LYON.

References Cited in the file of this patent

UNITED STATES PATENTS

| Number | Name | Date |
|---|---|---|
| 933,880 | Brown | Sept. 14, 1909 |
| 1,304,965 | Hammarstrom | May 27, 1919 |